United States Patent
Sangani et al.

(10) Patent No.: US 12,475,069 B2
(45) Date of Patent: Nov. 18, 2025

(54) DYNAMIC POWER GATING USING DETERMINISTIC INTERCONNECT

(71) Applicant: TEXAS INSTRUMENTS INCORPORATED, Dallas, TX (US)

(72) Inventors: Nikhil Sangani, Bangalore (IN); Mihir Mody, Bangalore (IN); Malav Shah, Bangalore (IN); Athavan Arasumani, Pondicherry (PY); Shailesh Ghotgalkar, Bangalore (IN)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 45 days.

(21) Appl. No.: 18/498,581

(22) Filed: Oct. 31, 2023

(65) Prior Publication Data
US 2025/0139031 A1    May 1, 2025

(30) Foreign Application Priority Data
Jun. 28, 2023    (IN) .............................. 202341043216

(51) Int. Cl.
G06F 13/20        (2006.01)
(52) U.S. Cl.
CPC .......... G06F 13/20 (2013.01); *G06F 2213/40* (2013.01)
(58) Field of Classification Search
CPC .............................. G06F 13/20; G06F 2213/40
See application file for complete search history.

(56) References Cited

U.S. PATENT DOCUMENTS

| | | | | |
|---|---|---|---|---|
| 10,673,648 | B1* | 6/2020 | Viljoen | G06F 13/4282 |
| 11,030,142 | B2* | 6/2021 | Foust | G06F 13/4291 |
| 11,467,654 | B2* | 10/2022 | Rowley | G06F 1/26 |
| 11,928,066 | B2* | 3/2024 | Van Bourgognie | G06F 13/4031 |
| 2018/0260357 | A1* | 9/2018 | Amon | G06F 13/404 |
| 2019/0004986 | A1* | 1/2019 | Chang | G06F 13/24 |
| 2019/0004991 | A1* | 1/2019 | Foust | G06F 13/364 |
| 2020/0364160 | A1* | 11/2020 | Jin | G06F 13/4291 |
| 2024/0202156 | A1* | 6/2024 | Heo | G06F 13/4068 |
| 2024/0385978 | A1* | 11/2024 | Cao | G06F 13/20 |

* cited by examiner

*Primary Examiner* — Henry Tsai
*Assistant Examiner* — Christopher A Daley
(74) *Attorney, Agent, or Firm* — Michael T. Gabrik; Frank D. Cimino (57) ABSTRACT

Various examples disclosed herein relate to deterministically controlling interconnect operations to provide dynamic power gating for a system. In an example, a microcontroller unit (MCU) is provided that includes a group of processing devices, a group of target resources, interconnect circuitry, and clock control circuitry. The interconnect circuitry connects the group of processing devices to the group of target resources. The clock control circuitry is coupled to the interconnect circuitry. The clock control circuitry is configured to identify an upcoming occurrence of a communication between a pair of devices comprised of one of the processing devices and one of the target resources, and prior to the occurrence of the communication, enable a clock associated with a path through the interconnect circuitry between the pair of devices.

20 Claims, 5 Drawing Sheets

DYNAMIC POWER GATING USING DETERMINISTIC INTERCONNECT

RELATED APPLICATIONS

This application hereby claims the benefit and priority to India Provisional Application No. 202341043216 titled "System and Method for Real-Time and Deterministic Interconnect," filed Jun. 28, 2023, which is hereby incorporated by reference in its entirety.

TECHNICAL FIELD

This relates generally to power-gating components of an embedded system by controlling operations of an interconnect.

BACKGROUND

Microcontroller units (MCUs) are designed to run software programs and perform functions enabled by running the software programs. To do so, MCUs can include processing cores configured to execute software and memory, coupled with the processing cores, that stores the instructions and data of the software. For example, MCUs may have one or more central processing units (CPUs) that communicate with random access memory (RAM) to execute such software programs. The MCUs may further include an interconnect for communication between the processing cores and the different memories.

Existing solutions may employ hard-coded power-gating techniques in an interconnect to conserve power in an MCU. For example, such solutions may control how much power is allocated for each port (e.g., how frequently the port enters a low power mode and/or how frequently the port wakes from the low power mode) connecting a CPU to a memory in the interconnect based on pre-determined access to the ports identified in program instructions. More specifically, more power may be accessible to a first port of the interconnect if the program instructions require more use of the first port than a second port, for example. However, these solutions add latency to MCU operations as clock cycles may be required to trigger an initialization of a target memory prior to access. Further, such power-gating techniques may use more power than necessary as real-time power requirements may vary during MCU operations.

SUMMARY

Disclosed herein are improvements to power and clock gating in microcontroller units (MCUs). An interconnect in an MCU may be included to route data and/or transactions, such as access requests, from a set of initiators (e.g., processing devices) to a set of target resources during the execution of program code. The MCU may selectively provide power and clock signals to different ports of the interconnect to drive the interconnect based on which ports are being accessed at a given time. In an example embodiment, a microcontroller unit (MCU) is provided that includes a group of processing devices, a group of target resources, interconnect circuitry, and clock control circuitry. The interconnect circuitry connects the group of processing devices to the group of target resources. The clock control circuitry is coupled to the interconnect circuitry. The clock control circuitry is configured to identify an upcoming occurrence of a communication between a pair of devices comprised of one of the processing devices and one of the target resources, and prior to the occurrence of the communication, enable a clock associated with a path through the interconnect circuitry between the pair of devices.

This Summary is provided to introduce a selection of concepts in a simplified form that are further described below in the Detailed Description. It may be understood that this Summary is not intended to identify key features or essential features of the claimed subject matter, nor is it intended to be used to limit the scope of the claimed subject matter.

BRIEF DESCRIPTION OF THE DRAWINGS

The drawings are not necessarily drawn to scale. In the drawings, like reference numerals designate corresponding parts throughout the several views. In some examples, components or operations may be separated into different blocks or may be combined into a single block.

DETAILED DESCRIPTION

Discussed herein are enhanced components, techniques, and systems related to power and clock gating in embedded systems, or systems-on-chip (SOCs), such as microcontroller units (MCUs). An interconnect in an MCU may be included to route data and transactions (e.g., access requests) from a set of initiators (e.g., processing devices) to a set of target resources during the execution of program code. The MCU may selectively provide power and clock signals to different ports of the interconnect to drive the interconnect based on which ports are being accessed at a given time. This concept may be referred to as power gating or clock gating. Existing solutions to power gating include hard-coding or specifying, via software, how much power is provided to ports of an interconnect at given times (e.g., designating a port as always-on or otherwise limiting how often the port may enter a low power mode and the duration thereof) based on predicted use. However, such solutions may fail to take into consideration real-time activity, allocation swapping, and the like, while also introducing latency into MCU operations by either mispredicting or initializing ports and resources (e.g., memory, peripherals) only when access is prompted by a processor.

Instead, a system or circuitry disclosed herein can reduce overall power consumption of the MCU by including hardware to dynamically power certain ports of an interconnect based on real-time access requirements instead of or in addition to software-based predictions of when accesses may be made. For example, clock control circuitry may be included in an MCU to predict real-time access of certain target resources and "wake up" ports of the interconnect before access is required to reduce latency. In some examples, the clock control circuitry can perform in one of three different modes to adapt to real-time activity and predict when a path through the interconnect between a processing device and a target device may be used. Advantageously, such a system may employ a deterministic approach to enable real-time dynamic power-gating, which may ultimately reduce latency and power consumption in the MCU.

In an example embodiment, a microcontroller unit (MCU) is provided that includes a group of processing devices, a group of target resources, interconnect circuitry, and clock control circuitry. The interconnect circuitry connects the group of processing devices to the group of target resources. The clock control circuitry is coupled to the interconnect circuitry. The clock control circuitry is configured to identify an upcoming occurrence of a communication between a pair of devices comprised of one of the processing devices and one of the target resources, and prior to the occurrence of the communication, enable a clock associated with a path through the interconnect circuitry between the pair of devices.

In another example embodiment, an integrated circuit is provided. The integrated circuit includes detection circuitry, enable circuitry coupled to the detection circuitry, and timing circuitry coupled to the enable circuitry. The detection circuitry is configured to identify an upcoming occurrence of a communication between a pair of devices comprised of a processing device of a group of processing devices and a target resource of a group of target resources, and provide an indication of the upcoming occurrence of the communication to the enable circuitry. The enable circuitry is configured to, in response to receiving the indication of the upcoming occurrence of the communication and prior to the occurrence of the communication, enable a clock of the timing circuitry associated with a path through interconnect circuitry between the pair of devices, wherein the interconnect circuitry connects the group of the processing devices to the group of the target resources. The timing circuitry is configured to provide the clock to the target resource.

In yet another example embodiment, a method is provided. The method includes identifying an upcoming occurrence of a communication between a pair of devices comprised of a processing device of a group of processing devices and a target resource of a group of target resources, prior to the occurrence of the communication, enabling a clock associated with a path through interconnect circuitry between the pair of devices, wherein the interconnect circuitry connects the group of the processing devices to the group of the target resources, and providing the clock to the target resource for performance of the communication.

Figure 1:
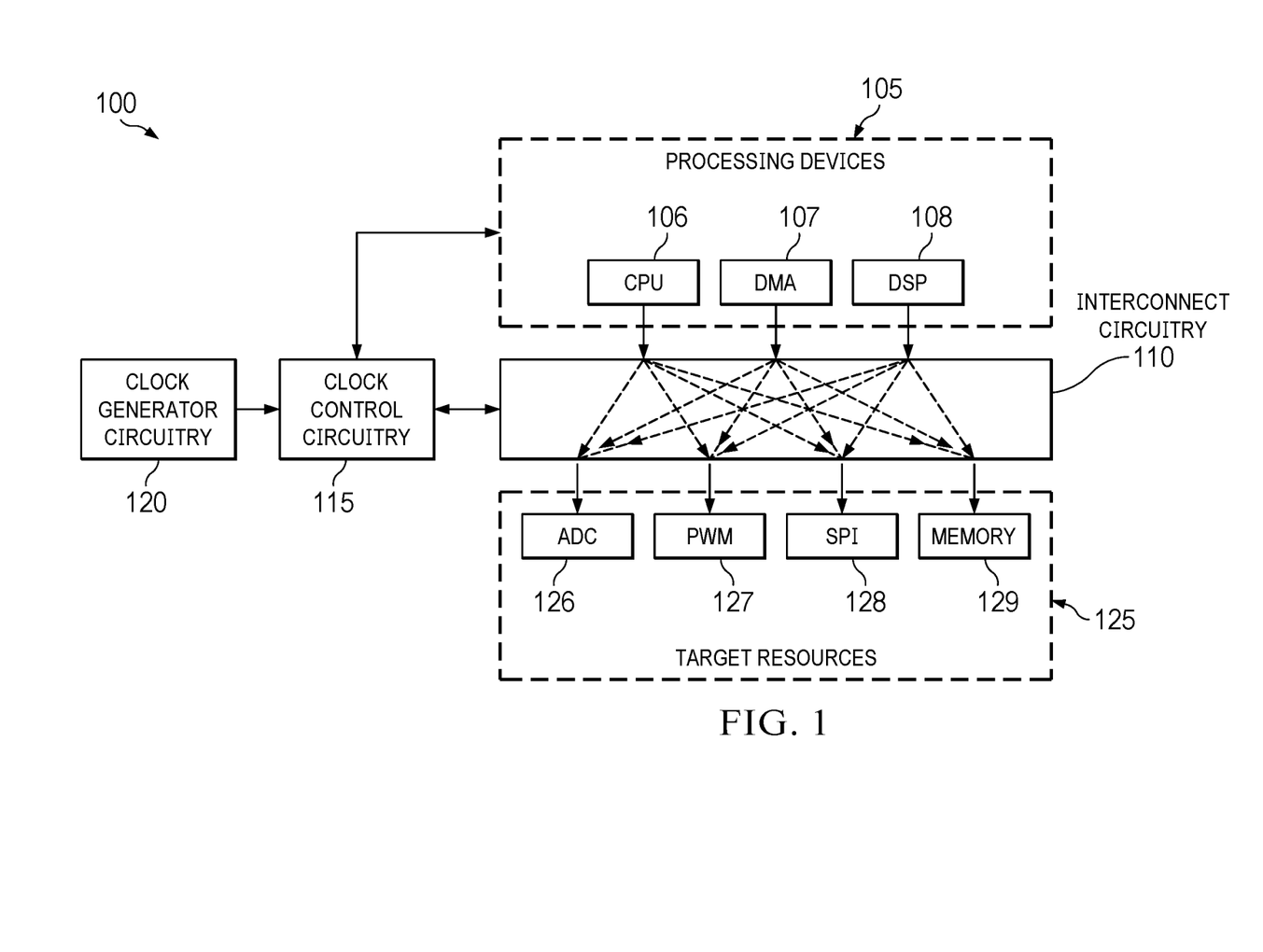
FIG. 1 illustrates an example operating environment for deterministically controlling operations of an interconnect in accordance with an implementation.

FIG. 1 illustrates an example operating environment for deterministically controlling operations of an interconnect in accordance with an implementation. FIG. 1 includes operating environment 100, which includes processing devices 105, interconnect circuitry 110, clock control circuitry 115, clock generator circuitry 120, and target resources 125. Processing devices 105 include devices such as central processing unit (CPU) 106, direct memory access (DMA) 107, and digital signal processor (DSP) 108. Target resources 125 include devices such as analog-to-digital converter (ADC) 126, pulse-width modulator (PWM) 127, and serial-port interface (SPI) 128. In various examples, clock control circuitry 115 may be configured to control power-gating operations, such as process 500 of FIG. 5, in operating environment 100 and selectively provide clock signals to interconnect circuitry 110.

Operating environment 100 includes various components that together may be representative of a processing system, such as a microcontroller unit (MCU). The processing system may include various fixed-purpose hardware components and components that may execute firmware, software, hardware, or any combination or variation thereof. The components of operating environment 100 may be part of an embedded system, and thus, operate as a system-on-chip (SoC). However, in other embodiments, some elements of operating environment 100 may be located off-chip.

Processing devices 105 are representative of processors, processing cores, or processing devices capable of executing software and firmware, such as program instructions of application code. Such processors may include general purpose central processing units, application specific processors or circuits (e.g., ASICs), digital signal processors, logic devices (e.g., FPGAs), as well as any other type of processing device, combinations, or variations thereof. In this example, processing devices 105 include CPU 106, DMA 107, and DSP 108. In other examples, processing devices 105 may include additional or fewer devices, different devices, or any combination or variation of devices.

In operation, processing devices 105 may be configured to execute program instructions during operations of the MCU. In doing so, processing devices 105 may attempt to access one or more of target resources 125 via interconnect circuitry 110 to communicate with and/or execute code from target resources 125, for example. Access may refer to reading from or writing to one or more of target resources 125.

Target resources 125 are representative of memory devices, logic devices, hardware or hardware accelerator devices, and the like capable of storing data and performing functions based on instructions and requests from processing devices 105 via interconnect circuitry 110. Such resources may include volatile memory (e.g., flash memory), non-volatile memory (e.g., RAM), logic circuits and gates, interface devices, and other peripheral devices, as well as any other type of device, combinations, or variations thereof. In this example, target resources 125 include ADC 126, PWM 127, SPI 128, and memory 129. In other examples, target resources 125 may include additional or fewer devices, different devices, or any combination or variation of devices.

Interconnect circuitry 110 is representative of an interconnect device capable of electrically connecting processing devices 105 to target resources 125. For example, interconnect circuitry 110 may include one or more ports coupled to each of the processing devices 105 and target resources 125 and be configured to route requests and access from processing devices 105 to target resources 125. The interconnect circuitry 110 may include a set of paths coupling the ports, and these paths may include fixed dedicated paths as well as a paths within a crossbar or other reconfigurable communication structure. Thus, each processing device of processing devices 105 and each target resource of target resources 125 may have a unique, dedicated path within interconnect circuitry 110. CPU 106 may have a first path to communicate with ADC 126, a second path to communicate with PWM 127, a third path to communicate with SPI 128, and a fourth path to communicate with memory 129. Similarly, DMA 107 and DSP 108 each have paths to communicate with each of ADC 126, PWM 127, SPI 128, and memory 129, respectively.

Clock control circuitry 115 may be included and coupled to interconnect circuitry 110 to control which ports and paths of interconnect circuitry 110 may be enabled at a given time based on access requirements of processing devices 105. In effect, selectively disabling ports and paths may provide power conservation for interconnect circuitry 110, target resources 125, and the system overall. Clock control circuitry 115 may be representative of a circuit or device capable of monitoring for communications, such as access events, including read requests or write requests, from processing devices 105 during the execution of program instructions, predicting upcoming communications, and enabling access to a target resource using a clock signal generated by clock generator circuitry 120 (e.g., a timing circuit including an oscillator). In some examples, clock control circuitry 115 may be a hardware accelerator including one or more dedicated hardware components capable of providing such functionality. In other examples, clock control circuitry 115 may include components capable of executing software stored in a memory (not shown) to perform such functionality. In such examples, the memory of clock control circuitry 115 or external to clock control circuitry 115 may be a non-transitory, computer-readable storage medium capable of storing program instructions that, when executed by a processing device of clock control circuitry 115, enable clock control circuitry 115 to perform clock-gating functionality.

In various examples, clock control circuitry 115 may operate in one of three modes to perform clock-gating functions.

In a first mode, clock control circuitry 115 may include a timer, and clock control circuitry 115 can set the timer for a period of time corresponding to a control loop executable by one or more of processing devices 105 and one or more of target resources 125. A control loop may refer to a repeated and/or sequential access event or communication occurring between a processing device and a target resource. In an example, a control loop associated with PWM 127 expects an input from CPU 106 (e.g., a memory mapped register write) every X ns. The control loop may run for a pre-determined amount of time and at pre-determined intervals of time. Thus, clock control circuitry 115 can identify upcoming communications and which path of interconnect circuitry 110 needs to be enabled for the upcoming communications at given times based on the duration and timing of the control loop. While the timer is running and has not met a threshold, the clock control circuitry 115 may gate a clock signal intended for a port associated with the CPU 106, a port associated with PWM 127, and/or portions of the path within interconnect circuitry 110 between these two ports. When the timer reaches the threshold, clock control circuitry 115 can stop gating and allow the clock signal from clock generator circuitry 120 to transition and provide the clock signal to a target resource and enable the path of interconnect circuitry 110 associated with the processing device and the target resource (e.g., the first path between CPU 106 and PWM 127).

In a second mode, clock control circuitry 115 may include an offset counter triggered by a communication associated with a target resource 125, and clock control circuitry 115 can identify upcoming access communications based on the state of the counter. For example, the clock control circuitry 115 may detect a communication associated with ADC 126 that indicates a sample will be ready for processing by the CPU 106 in N cycles (e.g., ADC begins conversion operation). The clock control circuitry 115 may include a finite state machine (FSM) that can utilize the offset counter to predict when the subsequent communication may occur that involve communication between the processing device and the target resource (e.g., ADC sample ready). While offset counter has not met a threshold, the clock control circuitry 115 may gate a clock signal intended for a port associated with the CPU 106, a port associated with ADC 126, and/or portions of the path within interconnect circuitry 110 between these two ports. When the counter reaches the threshold, clock control circuitry 115 clock control circuitry 115 can stop gating and allow the clock signal from clock generator circuitry 120 to transition and provide the clock signal to a target resource and enable the path of interconnect circuitry 110 associated with the processing device and the target resource (e.g., the path between CPU 106 and ADC 126).

In a third mode, clock control circuitry 115 may include a timer, and clock control circuitry 115 can set the timer based on statistics gathered from processing devices 105 over test runs, other execution cycles, and the like. For example, clock control circuitry 115 may be coupled with each of processing devices 105 and can determine average times between access between a processing device and a target resource, minimum times between access between a processing device and a target resource, and maximum times between a processing device and a target resource. Clock control circuitry 115 may use any one or more of these statistical inputs to set the timer, and when the timer reaches a certain time, clock control circuitry 115 can clock control circuitry 115 can stop gating and allow the clock signal from clock generator circuitry 120 to transition and provide the clock signal to a target resource and enable the path of interconnect circuitry 110 associated with the processing device and the target resource (e.g., the path between DSP 108 and SPI 128).

Advantageously, clock control circuitry 115 can dynamically and deterministically identify when an upcoming communication event between a processing device and a target resource may occur without software intervention and "wake-up" respective devices and/or program memory-mapped registers of the processing device before the upcoming event occurs, which may reduce latency, among other benefits. Any combination or variation of mode can be used at a given time. For example, for a path between CPU 106 and ADC 126, clock control circuitry 115 may use the second mode for clock-gating and for a path between CPU 106 and PWM 127, clock control circuitry 115 may use the first mode for clock-gating.

Figure 2:
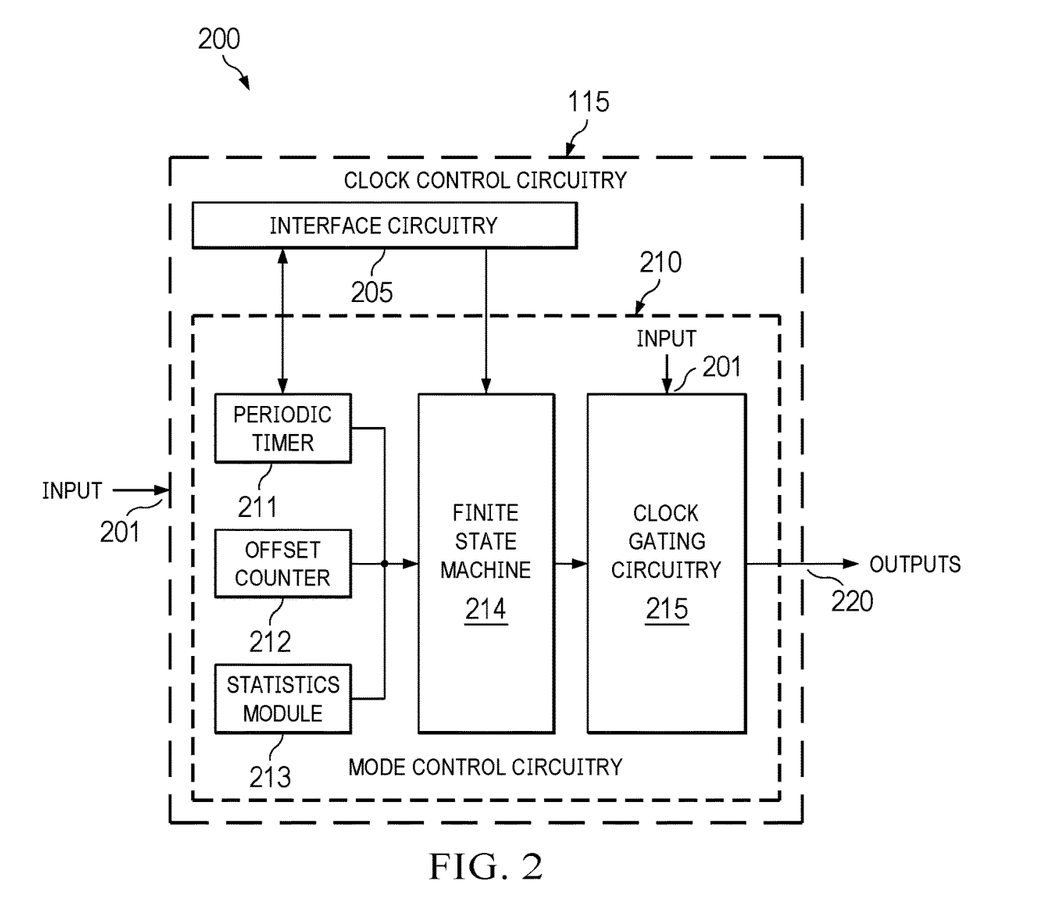
FIG. 2 illustrates an example block diagram of components of clock control circuitry in accordance with an implementation.

FIG. 2 illustrates an example block diagram of components of clock control circuitry in accordance with an implementation. FIG. 2 includes block diagram 200, which references elements of operating environment 100 of FIG. 1. Block diagram 200 includes clock control circuitry 115, which further includes interface circuitry 205 and mode control circuitry 210. Mode control circuitry 210 includes periodic timer 211, offset counter 212, statistics module 213, finite state machine (FSM) 214, and clock gating circuitry 215.

Clock control circuitry 115 may be representative of one or more circuits or devices capable of monitoring for communications including access events, such as read requests or write requests, from processing devices (e.g., processing devices 105) to target resources (e.g., target resources 125) during the execution of program instructions, predicting upcoming access events, and enabling access, via interconnect circuitry (e.g., interconnect circuitry 110), to a target resource using a clock signal (input 201) generated by timing circuitry (e.g., clock generator circuitry 120). For example, clock control circuitry 115 may include interface circuitry 205 and mode control circuitry 210. Clock control circuitry 115 can obtain input 201, one or more clock signals, from a clock generation circuit (e.g., clock generator circuit 120), and provide outputs 220, one or more of the clock signals, to the interconnect circuitry, one or more of the processing devices, and/or one or more of the target resources, or any combination or variation thereof.

Interface circuitry 205 may be included as an interface between mode control circuitry 210 and the processing devices. In various examples, interface circuitry 205 can receive mode selection inputs from one or more of the processing devices (e.g., CPU 106). The mode selection inputs may include timing information, interconnect path information, access information, statistical information, and the like. For example, the mode selection inputs may include information related to the timing configuration of period timer 211 of mode control circuitry 210. By way of another example, the mode selection inputs may include statistics obtained from one or more of the processing devices, such as average times between access events between a processing device and a target resource, minimum times between access events between a processing device and a target resource, and maximum times between access between a processing device and a target resource. Interface circuitry 205 may provide such statistics to statistics module 213 of mode control circuitry 210.

Interface circuitry 205 may include one or more circuits and hardware elements capable of identifying and detecting an upcoming access event between a processing device and a target resource and enabling access, via the interconnect circuitry, to the target resource such as by enabling a mode of mode control circuitry 210, enabling finite state machine 214, and enabling clock gating circuitry 215 to provide a clock signal (outputs 220) to the target resource to initialize the target resource before the event occurs.

Mode control circuitry 210 may be coupled to interface circuitry 205 to enable gating functionality based on input 201. Mode control circuitry 210 includes periodic timer 211, offset counter 212, statistics module 213, finite state machine 214, and clock gating circuitry 215.

Periodic timer 211 is representative of a timing device or circuit that can utilize a timer that may be used to periodically wake-up a target device based on timing information provided by interface circuitry 205. For example, timing information may indicate how often, and for what duration, a processing device accesses a target resource. Periodic timer 211 can generate one or more timers for each processing device, such as one for each access event that each processing device executes, and provides indications of the timers to finite state machine 214.

Offset counter 212 is representative of a counter device or circuit that can utilize a counter that may be used to wake-up a target device once the counter reaches a certain value. Offset counter 212 can generate one or more counters for each processing device, such as one for each access event that each processing device executes, and provides indications of the counters to finite state machine 214.

Statistics module 213 is representative of a device or circuit that can utilize statistics provided by interface circuitry 205 to produce timing indications of when to wake-up a target device. Statistics module 213 can provide the timing indications to finite state machine 214.

Finite state machine 214 is included to select a clock-gating mode, or one of periodic timer 211, offset counter 212, or statistics module 213, to control access via the interconnect circuitry. In various examples, a processing device, such as CPU 106 or a different processor, can direct finite state machine 214, via interface circuitry 205, to use one of periodic timer 211, offset counter 212, and statistics module 213 for each pair of processing devices and target resources. In other examples, finite state machine 214 may be pre-configured to select a mode for each pair of processing devices and target resources. Prior to a communication occurring and based on the pair of processing device and target resource, finite state machine 214 can enable clock gating circuitry 215 to provide a clock signal (e.g., outputs 220) to the target device and/or the interconnect circuitry.

Clock gating circuitry 215 is included to enable one or more different clock signals at different times based on signals provided by finite state machine 214. Clock gating circuitry 215 may be coupled to receive input 201 (e.g., a clock signal) from a clock generation circuit (e.g., clock generator circuitry 120) and may be configured to provide a clock signal as outputs 220 downstream.

Outputs 220 may include one or more clock signals produced by the timing circuit. Finite state machine 214 may enable clock gating circuitry 215 to provide a different clock signal to each target resource and at different times. For example, finite state machine 214 may utilize a first mode (e.g., periodic timer 211) for a first pair of a processing device and a target resource, a second mode (e.g., offset counter 212) for a second pair of a processing device and a target resource, and a third mode (e.g., statistics module 213) for a third pair of a processing device and a target resource. Accordingly, each mode may cause a wake-up trigger for a target resource at a different time.

Figure 3:
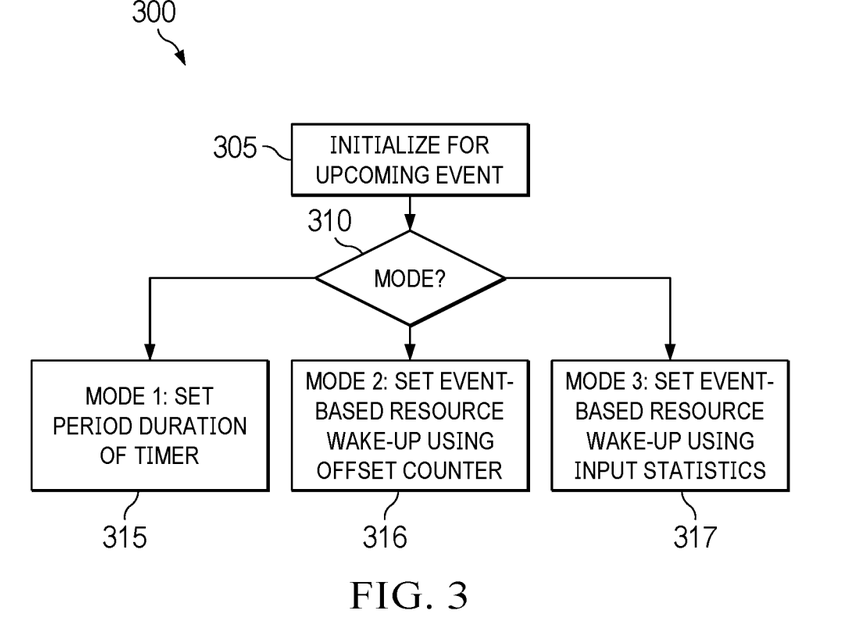
FIG. 3 illustrates example logic configuration of clock control circuitry in accordance with an implementation.

FIG. 3 illustrates example logic configuration of clock control circuitry in accordance with an implementation. FIG. 3 includes sequence 300, which includes a sequence of events that clock control circuitry, such as clock control circuitry 115 of FIG. 1, may be configured with for performing dynamic clock gating operations in an embodiment. In various examples, a processor of a system may configure a finite state machine (e.g., finite state machine 214) of a clock control circuit (e.g., clock control circuitry 115) with sequence 300 to control clock-gating operations of the system.

Sequence 300 begins with step 305, wherein a processor initializes the finite state machine for an upcoming communication. An upcoming communication may be a read request from a processing device to a particular target resource, a write request from a processing device to a particular target resource, or another type of access, communication, or event between a pair of devices.

In step 310, the finite state machine determines a mode to use for the upcoming communication. In some examples, the finite state machine is pre-configured with modes for each pair of processing device and target resource. In other examples, the processor may direct the finite state machine to utilize a mode for a given pair of devices before an upcoming communication.

Mode 1 may include utilizing a timer set for a duration of time and enabling a clock based on the timer reaching a time. Mode 1 may be performed using a timer device, such as periodic timer 211 of FIG. 2. The duration may be a pre-determined value set by the processor, or the duration may be determined by the periodic timer device based on historical use of a path of an interconnect circuit between a given processing device and target resource. If the finite state machine is configured to use mode 1 for the upcoming communication, the finite state machine can obtain a timer indication from the periodic timer device in step 315 and enable a clock based on the timer indication.

Mode 2 may include utilizing an offset counter that is triggered by a communication and enabling a clock based on the counter reaching a value. Mode 2 may be performed using a counter device, such as offset counter 212 of FIG. 2. The counter may be a pre-determined counter set by the processor. However, the counter may also be determined by the counter device based on historical use of a path of the interconnect circuit between a given processing device and target resource. If the finite state machine is configured to use mode 2 for the upcoming communication, the finite state machine can obtain a counter indication from the counter device in step 316 and enable a clock based on the counter indication to wake-up the target resource prior to the communication occurring.

Mode 3 may include using statistics and enabling a clock at a given time determined by analyzing the statistics. Mode 3 may be performed using a statistics module, such as statistics module 213 of FIG. 2. The statistics may include average times between access between a processing device and a target resource, minimum times between access between a processing device and a target resource, and maximum times between access between a processing device and a target resource. Based on the statistics, the statistics module may determine one or more times to wake-up target resources. If the finite state machine is configured to use mode 3 for the upcoming communication, the finite state machine can obtain timing indications from the statistics module in step 317 and enable a clock accordingly to wake-up the target resource prior to the communication occurring.

In various examples, a finite state machine may be configured to use a different mode for each pair of processing device and target resource and/or for each upcoming communication, or type thereof. The configuration of the finite state machine may be performed prior to run-time operations of the MCU, however, the configuration may also be performed in real-time by a processor of the MCU. In such examples, the processor that configures the finite state machine, among other elements of the clock control circuitry, may be one of the processing devices, or it may be a separate processing device.

Figure 4:
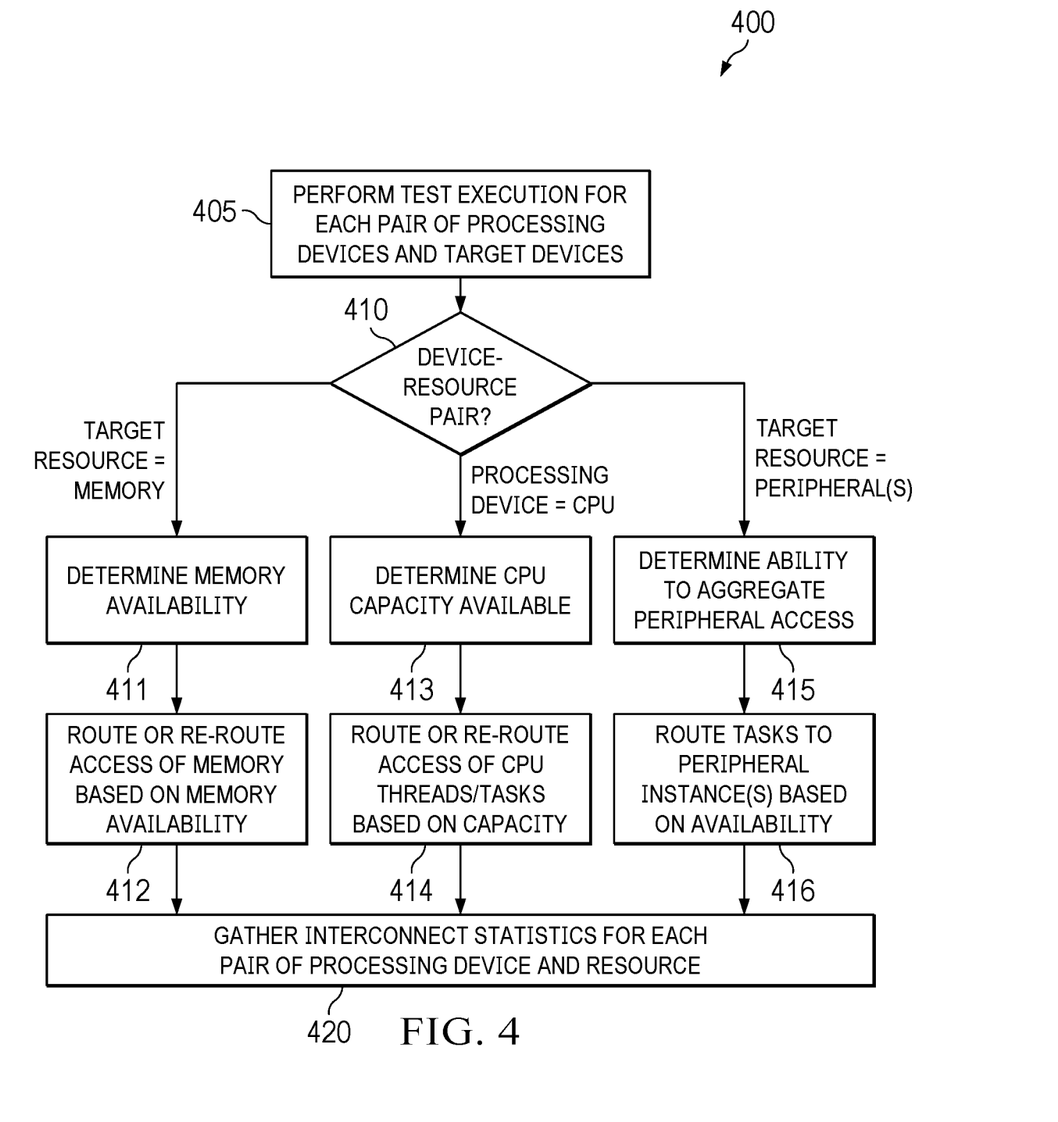
FIG. 4 illustrates example logic configuration of clock control circuitry in accordance with an implementation.

FIG. 4 illustrates example logic configuration of clock control circuitry in accordance with an implementation. FIG. 4 includes sequence 400, which includes a sequence of events that clock control circuitry, such as clock control circuitry 115 of FIG. 1, may be configured with for performing dynamic clock gating operations in an embodiment. In various examples, a processing device of a system may configure a finite state machine (e.g., finite state machine 214) of a clock control circuit (e.g., clock control circuitry 115) with sequence 400 to control clock-gating operations of the system.

Sequence 400 begins with step 405, wherein a processor (e.g., a CPU) performs a test execution for each pair of processing devices (e.g., processing devices 105 of FIG. 1) and target devices (e.g., target devices 125 of FIG. 1). The test execution may include a profile test run where the processor executes program instructions prior to run-time operations. During the test run, the processor can identify which paths of an interconnect are used, how many times the paths are used, under what conditions the paths are used, and other information.

In step 410, the processor can identify configurations based on a given pair of processing device and target resource.

If the target resource is a memory device (e.g., random access memory, flash memory) or multiple memory devices, the processor can determine the capacity and availability of the memories in step 411. Based on the capacity and availability of the memories, the processor can update routes, or paths, in the interconnect to consolidate the number of memories used for a given event. For example, if a processing device accessed two memories during the test run, the processor may change the target devices accessible by the processing device from two memories to a single memory, if possible. The processor can provide any changes made in step 412 to clock control circuitry that can enable a clock signal during run-time operations.

If the processing device is a processor or processing core (e.g., CPU 106 of FIG. 1), the processor can determine the available capacity of the CPU in step 413. If the CPU has availability on different threads or to perform tasks in different orders, for example, the processor can update the CPU's access to one or more of the target resources accordingly in step 414.

If the target resource is a peripheral, the processor can determine the ability to aggregate access to the peripheral in step 415. For example, if a processing device, during the test run, accesses a peripheral multiple times at different times, the processor may attempt to aggregate access to that peripheral to fewer times. By way of another example, if a processing device, during the test run, accesses multiple instances of a peripheral at different times, the processor may attempt to aggregate access to fewer peripheral instances. Based on the peripheral, or peripheral instances, availability, the processor may route tasks differently than in the test run in step 416.

Following the target resource and processing device specific updates, the processor, in step 420, can gather interconnect statistics for each pair of processing devices and target resources. Examples of the statistics may include how many times a path of interconnect circuitry was used during the execution of the program instructions, durations of access between each pair of processing devices and target devices, and the like. The processor can provide the statistics to clock control circuitry for use in clock-gating processes during run-time operations of the system.

Figure 5:
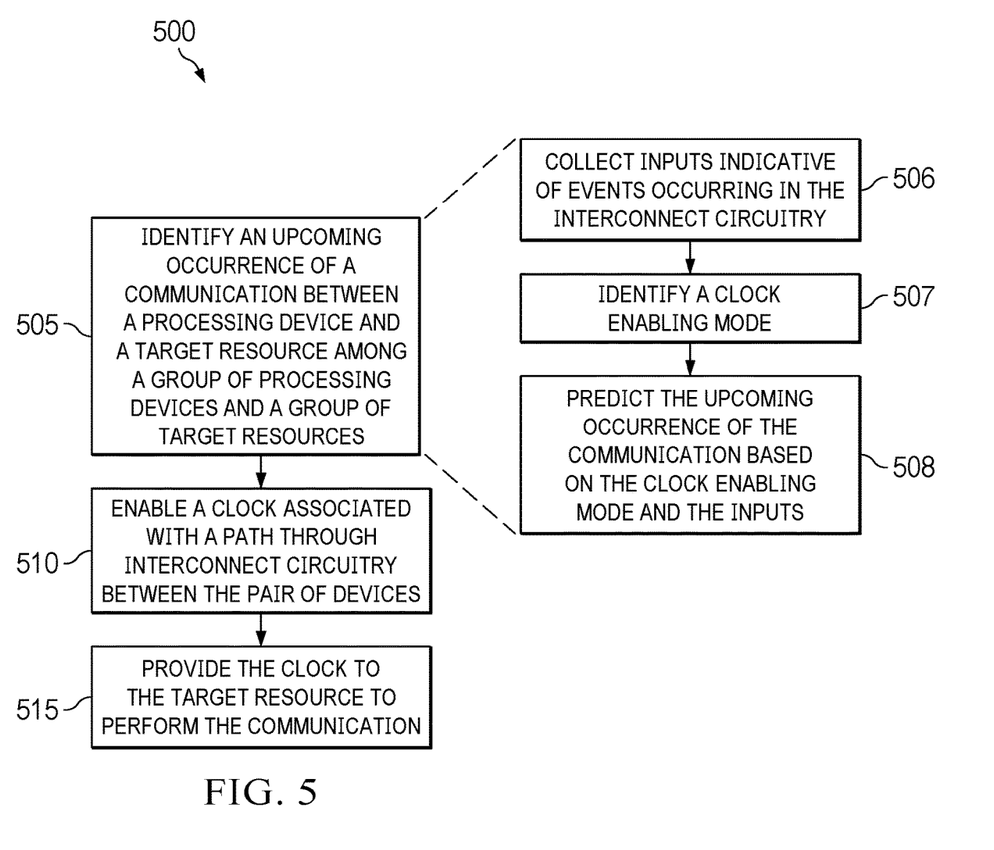
FIG. 5 illustrates a series of steps for controlling operations of an interconnect in an implementation.

FIG. 5 illustrates a series of steps for controlling operations of an interconnect in an implementation. FIG. 5 includes process 500 described below, which references elements of FIG. 1. Process 500 can be implemented on software, firmware, and/or fixed-purpose hardware, or any combination or variation thereof. For example, memory access circuitry, such as clock control circuitry 115 of FIG. 1, can execute process 500.

In operation 505, clock control circuitry 115 can identify an upcoming occurrence of a communication between a processing device and a target resource among a group of processing devices 105 and a group of target resources 125 of an embedded system (e.g., an MCU). In one example, processing devices 105 may include CPU 106, DMA 107, and DSP 108. Processing devices 105 may be configured to execute program instructions during operations of the system. In doing so, processing devices 105 may attempt to access one or more of target resources 125 via interconnect circuitry 110 to communicate with and/or execute code from target resources 125, for example. Access may refer to reading from or writing to one or more of target resources 125.

Target resources 125 are representative of memory devices, logic devices, hardware or hardware accelerator devices, and the like capable of storing data and performing functions based on instructions and requests from processing devices 105 via interconnect circuitry 110. Such resources may include volatile memory (e.g., flash memory), non-volatile memory (e.g., RAM), logic circuits and gates, interface devices, and other peripheral devices, as well as any other type of device, combinations, or variations thereof. In one example, target resources 125 include ADC 126, PWM 127, SPI 128, and memory 129.

Interconnect circuitry 110 is representative of an interconnect device capable of electrically connecting processing devices 105 to target resources 125. For example, interconnect circuitry 110 may include one or more ports coupled to each of the processing devices 105 and target resources 125 and be configured to route requests and access from processing devices 105 to target resources 125. The interconnect circuitry 110 may include a set of paths coupling the ports, and these paths may include fixed dedicated paths as well as a path within a crossbar or other reconfigurable communication structure. Thus, each processing device of processing devices 105 and each target resource of target resources 125 may have a unique, dedicated path within interconnect circuitry 110. CPU 106 may have a first path to communicate with ADC 126, a second path to communicate with PWM 127, a third path to communicate with SPI 128, and a fourth path to communicate with memory 129. Similarly, DMA 107 and DSP 108 each have paths to communicate with each of ADC 126, PWM 127, SPI 128, and memory 129, respectively.

Clock control circuitry 115 may be coupled to interconnect circuitry 110 to control which ports and paths of interconnect circuitry 110 may be enabled at a given time based on access requirements of processing devices 105. Clock control circuitry 115 may be representative of a circuit or device capable of monitoring for communications, such as access events, including read requests or write requests, from processing devices 105 during the execution of program instructions.

To identify the upcoming occurrence of the communication, clock control circuitry 115, in operation 506, can collect inputs indicative of events occurring in interconnect circuitry 110. In various examples, such inputs may include statistical inputs, timer inputs, and/or counter inputs, among other information. The statistical inputs may include statistics related to the execution of the program instructions, such as how many times a given path between a processing device and a target resource was invoked, the duration of the access of the target resource, and the like. The timing inputs may include indications of duration and times relating to when a given path between a processing device and a target resource is used during the execution of the program instructions. The counter inputs may include indications of a number of counters before, in-between, and/or after a given event related to access of a given path between a processing device and a target resource.

Next, in operation 507, clock control circuitry 115 can identify a clock enabling mode. The clock enabling mode may refer to the type of inputs clock control circuitry 115 may use for the upcoming communication. For example, a first mode may include using timing inputs, a second mode may include counter inputs, and a third mode may include using statistical inputs. Based on the clock enabling mode and the inputs related to the mode, clock control circuitry 115, in operation 508, can predict the upcoming occurrence of the communication. By way of example, when clock control circuitry 115 is configured to use statistical inputs, clock control circuitry 115 may predict the upcoming occurrence of the communication because the communication may repeatedly occur every n seconds for an average of y seconds. By way of another example, when clock control circuitry 115 is configured to use timing inputs, clock control circuitry 115 may predict the upcoming occurrence of the communication by using periodic timers set based on timing information gathered during a test run of various events. When the timer reaches a certain time, clock control circuitry 115 can determine that the communication is upcoming.

After identifying the upcoming occurrence of the communication, clock control circuitry 115, in operation 510, can enable a clock, produced by clock generator circuitry 120, that is associated with a path through interconnect circuitry 110 between the pair of the processing device and the target resource.

In operation 515, clock control circuitry 115 provides the identified clock to the target resource so the target resource can initialize, or wake-up, and prepare to perform the communication. In various examples, clock control circuitry 115 provides the clock signal to the target resource an amount of time before the upcoming occurrence of the communication to reduce latency in the performance of the communication.

Clock control circuitry 115 may repeat process 500 a number of times during run-time operations of the system. Clock control circuitry 115 may use any combination or variation of modes for events or paths associated with processing devices and target resources. Advantageously, clock control circuitry 115 may wake-up target resources when needed during execution of program instructions with sufficient time to initialize the target resources to prevent delay in the execution of the program instructions. One of several modes may be chosen for each communication, which may provide deterministic and real-time clock-gating of the target resources unlike hard-coded clock-gating techniques.

While some examples provided herein are described in the context of a microcontroller unit (MCU), system-on-chip, processor, circuit, environment, or the like, it should be understood that the power and clock gating methods, techniques, and systems described herein are not limited to such examples and may apply to a variety of other processes, systems, applications, devices, and the like. Aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected." "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The phrases "in some examples," "according to some examples," "in the examples shown," "in other examples," and the like generally mean the particular feature, structure, or characteristic following the phrase is included in at least one implementation of the present technology, and may be included in more than one implementation. In addition, such phrases do not necessarily refer to the same example or different examples.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for" but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

What is claimed is:

1. A microcontroller unit, comprising:
a group of processing devices;
a group of target resources;
interconnect circuitry that connects the group of processing devices to the group of target resources;
clock control circuitry coupled to the interconnect circuitry and configurable to:
receive inputs indicative of events in the interconnect circuitry;
select a clock enabling mode, of multiple clock enabling modes, for communication between a processing device of the group of processing devices and a target resource of the group of target resources;
predict an upcoming occurrence of a communication between the processing device and the target resource based on a subset of the inputs related to the selected clock enabling mode; and
prior to the occurrence of the communication, enable a clock associated with a path through the interconnect circuitry between the processing device and the target resource based on the prediction.

2. The microcontroller unit of claim 1, wherein the clock control circuitry comprises a finite state machine and multiple devices, a subset of which is used in each of the clock enabling modes.

3. The microcontroller unit of claim 1, wherein the group of processing devices includes two or more of: a central processing unit (CPU), a digital signal processing (DSP) unit, and a direct memory access (DMA) unit, and wherein the group of target resources includes two or more of: an analog-to-digital converter (ADC), a pulse-width modulation (PWM) unit, and a serial-port interface (SPI).

4. The microcontroller unit of claim 1, wherein the interconnect circuitry comprises a plurality of paths between the group of processing devices and the group of target resources, wherein the plurality of paths includes a path for each pairing of a processing device of the group of processing devices and a target resource of the group of target resources.

5. The microcontroller unit of claim 2, wherein, to predict the upcoming occurrence of the communication, the finite state machine is configurable to obtain information from the subset of devices associated with the selected clock enabling mode.

6. The microcontroller unit of claim 2, wherein the multiple devices include a timer, a counter, and a statistics module, in which the timer is associated with a first clock enabling mode of the multiple clock enabling modes, the counter is associated with a second clock enabling mode of the multiple clock enabling modes, and the statistics module is associated with a third clock enabling mode of the multiple clock enabling modes.

7. The microcontroller unit of claim 5, wherein, to predict the upcoming occurrence of the communication between the processing device and the target resource, the finite state machine is configurable to:
use information from the timer when the selected clock enabling mode is the first clock enabling mode, use information from the counter when the selected clock enabling mode is the second clock enabling mode, and use information from the statistics module when the selected clock enabling mode is the third clock enabling mode.

8. An integrated circuit, comprising:

interface circuitry; and mode control circuitry coupled to the interface circuitry;

wherein the interface circuitry is configurable to:

obtain mode selection information from one or more processing devices of a group of processing devices; and     provide the mode selection information to the mode control circuitry; and wherein the mode control circuitry is configurable to, in response to receiving the mode selection information, select a clock enabling mode, of multiple clock enabling modes, use a subset of the mode selection information related to the selected clock enabling mode to predict an upcoming occurrence of a communication between a processing device of the group of processing devices and a target resource of a group of target resources, and prior to the occurrence of the communication, enable a clock associated with a path through interconnect circuitry between the processing device and the target resource to enable communication between the processing device and the target resource.

9. The integrated circuit of claim 8, wherein the mode control circuitry comprises a finite state machine that is configurable to obtain the mode selection information, the mode selection information including inputs indicative of communications occurring in the interconnect circuitry.

10. The integrated circuit of claim 8, wherein the group of processing devices includes two or more of: a central processing unit (CPU), a digital signal processing (DSP) unit, and a direct memory access (DMA) unit, and wherein the group of target resources includes two or more of: an analog-to-digital converter (ADC), a pulse-width modulation (PWM) unit, and a serial-port interface (SPI).

11. The integrated circuit of claim 8, further comprising interconnect circuitry that includes a plurality of paths between the group of processing devices and the group of target resources, wherein the plurality of paths includes a path for each pairing of a processing device of the group of processing devices and a target resource of the group of target resources.

12. The integrated circuit of claim 8, wherein the subset of the mode selection information used to predict the upcoming occurrence of the communication includes one or more factors monitored by the interface circuitry.

13. The integrated circuit of claim 12, wherein the one or more factors comprise a period of the communication and wherein, to predict the upcoming occurrence of the communication, the interface circuitry monitors a timer set based on the period of the communication.

14. The integrated circuit of claim 12, wherein the one or more factors comprise an occurrence of a triggering communication, and wherein to predict the upcoming occurrence of the communication, the interface circuitry monitors for occurrences of the triggering communication.

15. The integrated circuit of claim 12, wherein the mode control circuitry is further configured to provide the clock to the target resource.

16. A method of performing dynamic clock gating, the method comprising:

receiving inputs indicative of events in interconnect circuitry;

selecting a clock enabling mode, of multiple clock enabling modes, for communication between a processing device of the group of processing devices and a target resource of the group of target resources;

predicting an upcoming occurrence of a communication between the processing device and the target resource based on a subset of the inputs related to the selected clock enabling mode; and prior to the occurrence of the communication, enabling a clock associated with a path through interconnect circuitry between the processing device and the target resource, wherein the interconnect circuitry couples the processing device and the target resource for communication.

17. The method of claim 16, wherein the inputs statistics corresponding to previous occurrences of the events in the interconnect circuitry.

18. The method of claim 16, wherein the group of processing devices includes two or more of: a central processing unit (CPU), a digital signal processing (DSP) unit, and a direct memory access (DMA) unit, and wherein the group of target resources includes two or more of: an analog-to-digital converter (ADC), a pulse-width modulation (PWM) unit, and a serial-port interface (SPI).

19. The method of claim 16, wherein the interconnect circuitry comprises a plurality of paths between the group of processing devices and the group of target resources, wherein the plurality of paths includes a path for each pairing of a processing device of the group of processing devices and a target resource of the group of target resources.

20. The method of claim 16, wherein predicting the upcoming occurrence of the communication comprises setting a timer based on timing information associated with the communication and monitoring the timer.

\* \* \* \* \*